United States Patent
Hasegawa et al.

[11] Patent Number: 6,047,793
[45] Date of Patent: Apr. 11, 2000

[54] DEVICE FOR DETECTING ABRASION OF BRAKE FOR VEHICLE

[75] Inventors: Nobuki Hasegawa, Oyama; Yukio Sugano, Shiraoka-machi, both of Japan

[73] Assignee: Komatsu Ltd., Tokyo, Japan

[21] Appl. No.: 09/142,891

[22] PCT Filed: Mar. 17, 1997

[86] PCT No.: PCT/JP97/00844

§ 371 Date: Sep. 18, 1998

§ 102(e) Date: Sep. 18, 1998

[87] PCT Pub. No.: WO97/35122

PCT Pub. Date: Sep. 25, 1997

[30] Foreign Application Priority Data

Mar. 19, 1996 [JP] Japan .................................. 8-090367

[51] Int. Cl.⁷ .................................................. F16D 66/00
[52] U.S. Cl. ............................. 188/1.11 W; 188/1.11 L; 340/454
[58] Field of Search .............. 188/1.11 W, 1.11 E, 188/1.11 L, 1.11 R; 340/453, 454

[56] References Cited

U.S. PATENT DOCUMENTS 3,604,865  9/1971  Bricker .......................... 188/1.11 W
5,758,758  6/1998  Friedrich ......................... 340/454 X
5,975,250  11/1999 Brandmeier et al. ............. 188/1.11 W

FOREIGN PATENT DOCUMENTS

| | | |
|---|---|---|
| 55-170533 | 12/1980 | Japan . |
| 58-84436 | 6/1983 | Japan . |
| 59-67370 | 5/1984 | Japan . |
| 60-168928 | 9/1985 | Japan . |
| 61-35239 | 3/1986 | Japan . |
| 1-69927 | 5/1989 | Japan . |
| 1-102531 | 7/1989 | Japan . |

*Primary Examiner*—Paul N. Dickson
*Assistant Examiner*—Pamela J. Lipka
*Attorney, Agent, or Firm*—Sidley & Austin

[57] ABSTRACT

The present invention is a device for detecting abrasion of a brake for a vehicle, and is capable of accurately and surely detecting a time of abrasion. For this purpose, the device includes plates (3) engaged in an outer gear (2); discs (4), engaged in an inner gear (5); a piston (6), for bringing the plates (3) and the discs (4) into pressure contact to thereby brake a vehicle, a stroke sensor (26), for detecting an amount of displacement of the piston (6); an operation detecting device (27), for detecting an operation of a brake; and a computing unit (21), for computing amounts of abrasion of the plates (3) and the discs (4) based on detection signals from the operation detecting device (27) and the stroke sensor (26).

12 Claims, 6 Drawing Sheets

DEVICE FOR DETECTING ABRASION OF BRAKE FOR VEHICLE

TECHNICAL FIELD

The present invention relates to a device for detecting the abrasion of a vehicle brake.

BACKGROUND ART

As a brake for a vehicle, there is a conventionally well-known braking device which achieves braking by bringing a disc, provided at a rotating wheel side, and a plate, provided at an axle side, into pressure contact with each other by means of a piston operated by brake oil. Such a braking device is normally provided with a brake abrasion detecting device for detecting a time of abrasion of a plate and a disc, to facilitate an inspecting operation of the brake, and to prevent a failure from occurring in the brake.

Figure 9:
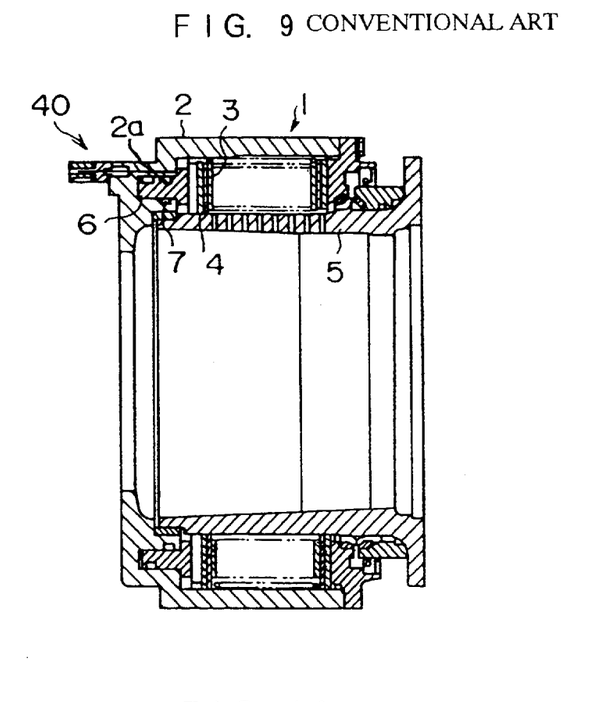
FIG. 9 is a sectional view of a abrasion detecting mechanism portion of a device for detecting abrasion according to the conventional art.
Figure 10:
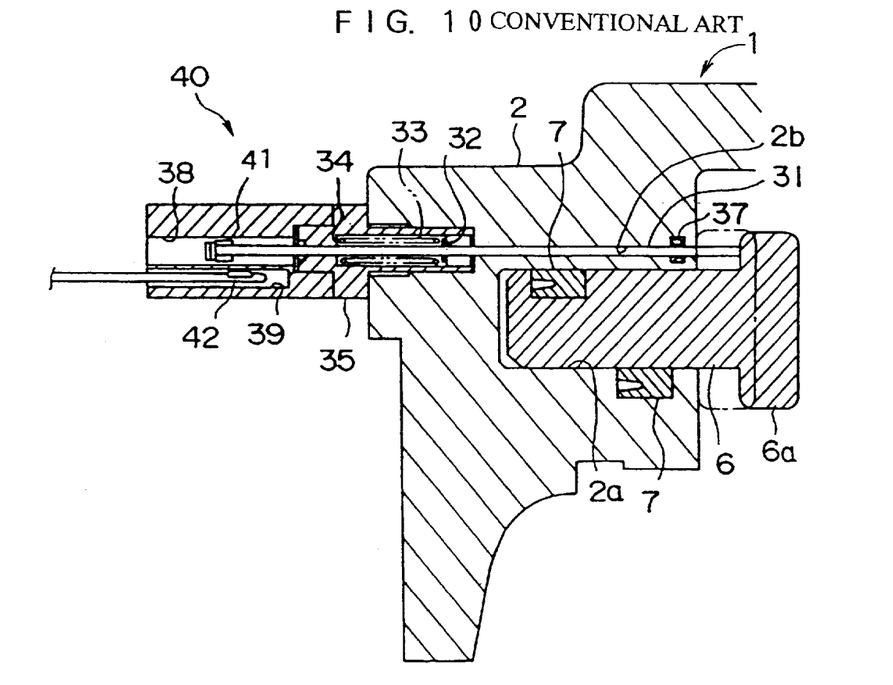
FIG. 10 is a sectional view of an essential part of the device for detecting abrasion in FIG. 9.

As such a brake abrasion detecting device, there is a device shown in, for example, FIGS. 9 and 10, which is an example of a wet type multiple disc brake 1. It has a hollow outer gear 2, having an almost cylindrical shape on the outer perimeter portion thereof. The inner surface of the hollow body of the outer gear 2 is provided with spline grooves. The hollow body houses therein a number of annular plates 3, having outer perimeter portions which are engaged in the spline grooves on the inner surface of the outer gear 2, and annular discs 4, which are alternately provided between these plates 3. Spline grooves are formed on an outer perimeter surface of an inner gear 5, having an almost cylindrical shape, which is provided at the axle side; and the inner perimeter portion of each of the discs 4 is engaged in a spline groove on the outer perimeter portion of the inner gear 5. Linings (not illustrated) are provided on both end surfaces of each of the discs 4, which face the plates 3. An annular cylinder 2a, having a radius of the same size as those of the plates 3 and the discs 4, is formed in one end of the outer gear 2. An annular piston 6 is provided inside the cylinder 2a. Further, brake oil is scaled by means of seal members 7 on the inner perimeter surface and the outer perimeter surface of the piston 6.

When brake oil is supplied from a supply line (not illustrated) into the cylinder 2a, the piston 6 is displaced toward the plates 3 and the discs 4. This displacement brings the plates 3 and the discs 4 into pressure contact with each other between the piston 6 and the other end of the outer gear 2. Thereby, braking force is applied to the inner gear 5, and the rotation of the wheel is braked.

A brake abrasion detecting mechanism 40 is attached at the end of the outer wall of the outer gear 2 behind the piston 6 (on the left in FIG. 10). The brake abrasion detecting mechanism 40 has a fixed member 35 of which one end is screwed into the end surface of the outer gear 2. A portion of the fixed member 35, which is inside the outer gear 2, is hollow. The fixed member 35 has a shaft 31 which penetrates through this hollow portion, and the shaft 31 penetrates through a hole 2b which is provided in the outer wall at the end of the outer gear 2. A seal member 37 is provided in the vicinity of the entrance of the hole 2b at the plate 3 side. A ring 32 is fixedly provided at a predetermined position on the outer perimeter portion of the shaft 31 inside the aforesaid hollow portion of the fixed member 35, and a spring 33 is provided between the ring 32 and an end face 34 of the aforesaid hollow portion. The spring 33 is always given momentum in a direction in which it stretches. The front end portion of the shaft 31 is pressed against a rear end surface of a pressurizing portion 6a of the piston 6 by the momentum of the spring 33.

A hole 38, through which the shaft 31 penetrates, and a hole 39, in the vicinity of the hole 38, are provided at the rear portion of the hollow portion of the fixed member 35. An annular magnet 41 is attached on the outer perimeter of the rear end portion of the shaft 31 penetrating through the hole 38 so as to move inside the hole 38 following the movement of the piston 6. A reed switch 42 is provided at a predetermined location in the hole 39, and when the magnet 41 approaches within a predetermined distance of that location, the output power contact point of the reed switch 42 is actuated. The output power contact point is inputted into a computing unit (not illustrated).

In a brake abrasion detecting device with the configuration as in the above, when the brake is applied by stepping on a brake pedal (not illustrated), the piston 6 moves forwardly, and brings the plates 3 and discs 4 into pressure contact with each other. Following this forward movement, the shaft 31 is moved as far as the same distance by the momentum of the spring 33. When the brake is released, back pressure is applied to the piston 6 by the oil pressure of brake cooling oil, which is supplied to the plates 3 and the discs 4. Then the piston 6 is returned as far as a predetermined distance by means of a piston returning amount adjusting mechanism (not illustrated), and the shaft 31 is returned against the momentum given thereto. In this way, while the amount of abrasion wear of the plates 3 and the discs 4 is small, the magnet 41 of the shaft 31 is not at the position to actuate the reed switch 42, even if the piston 6 is moved to the forward end. When the amount of abrasion wear of the plates 3 and the discs 4 is greater than the allowable value and the piston 6 reaches the forward end, the reed switch 42 is actuated by the magnet 41, and the time of abrasion can be detected.

However, in the aforesaid conventional braking device 1, there are a wide range of variations in the thickness of the plates 3 and the discs 4, the thickness of the pressurizing portion 6a of the piston 6, the length of the shaft 31, or the like, and a wide range of errors in the dimensions, of these products after being assembled. Due to these variations and errors, the conventional brake abrasion detecting device often makes erroneous detection. For this reason, it often happens that when the brake abrasion detecting device determines that abrasion has just occurred, that abrasion has not yet occurred, or that abrasion has advanced more than an allowable value. Accordingly, since the precision in abrasion detection is not stable, an operation of confirming the degree of the abrasion by disassembling the brake cannot be omitted; therefore there is a disadvantage of poor workability when performing maintenance.

SUMMARY OF THE INVENTION

The present invention is made to eliminate the above disadvantage of the prior art, and its object is to provide a device, for detecting abrasion of a vehicle brake, which is capable of accurately and surely detecting a time of abrasion.

A device for detecting abrasion of a vehicle brake according to the present invention is a device for detecting abrasion of a vehicle brake, having plates engaged in an outer gear, discs engaged in an inner gear, and a piston for bringing the plates and the discs into pressure contact with each other to thereby brake a vehicle, and is characterized by including a stroke sensor for detecting an amount of displacement (stroke) of the piston at the position where the plates and the discs are brought into pressure contact with each other; and an operation detecting means for detecting the brake operation, and a computing unit for computing amounts of abrasion of the plates and the discs from the difference between the detected stroke of the piston and the initial value which is the first detected value of the stroke of the piston.

According to the above configuration, the operation detecting means detects that the brake is being operated, and the stroke sensor detects an amount of displacement of the piston at the position where the discs and the plates are brought into pressure contact. The computing unit computes an amount of abrasion of the brake from the difference between the detected stroke position and the initial value, and determines that the time of abrasion has just come when the amount of abrasion is greater than a predetermined allowable value. Thereby, an amount of abrasion is accurately measured, therefore a time of abrasion can be accurately and surely detected. Accordingly, the operability when replacing brakes is improved.

Further, the computing unit can be additionally provided with a timer for outputting a measurement starting instruction after a predetermined time has passed since the time of detection of the brake operation, and a brake operating switch which is operated at the time of the brake operation and outputs a measurement starting instruction; and the computing unit can input a detection signal from the stroke sensor when inputting the measurement starting instruction from the timer and/or the brake operating switch.

According to the above configuration, a timer is provided in order to wait until after a predetermined time, from the time when the operation detecting means detects the operation of the brake until the piston completely brings the plates and the discs into pressure contact. The timer outputs a measurement starting instruction. Further, the brake operating switch, which is operated by an operator when the brake is surely operated (specifically, the plates and the discs are surely brought into pressure contact) and thereby outputs a measurement starting instruction, is provided. The computing unit inputs a signal from the stroke sensor when inputting the measurement starting instruction from the timer and/or the brake operating switch. Thereby the stroke can be detected at a time when the piston is completely applying the pressure; therefore an accurate amount of displacement of the piston can be detected. As a result, an amount of abrasion, which is the difference between the detected piston stroke and the initial value, can be accurately measured, thereby enabling one to surely detect the time of abrasion with excellent precision.

Further, the operation detecting means can include any one of a pressure sensor, for detecting the pressure of brake oil which is applied to the piston at the time of brake operation and a pressing amount sensor, for detecting an amount of pressure on a brake pedal; and the operation detecting means can detect the brake operation based on a detection signal from any one of the sensors.

According to the above configuration, when the pressure of the pressurized oil applied to the piston, which is detected by the pressure sensor, is more than a predetermined value, or when the detection value of the pressing amount sensor of the brake pedal is more than a predetermined value, it is determined that the brake is actuated (operated). Thereby the operation of the brake can be surely detected, and based on the detection, the stroke when the piston is at the forward end can be surely detected. As the result, an amount of abrasion can be accurately measured as in the above.

The computing unit can be additionally provided with a storage unit, and the computing unit can store an amount of displacement of the piston at each predetermined time in the storage unit, can determine that at least one of the plates and the discs has been replaced when the currently detected amount of displacement is smaller than the last stored amount of displacement by more than a predetermined value, and can store the current amount of displacement, which is smaller than the last stored amount by more than the predetermined value, as the initial value, and the replacement as a historic record, in the storage unit.

The above configuration is made based on the fact that an amount of displacement of the piston after replacing the brake suddenly becomes smaller than the historic data of the amount of displacement which has been detected before the replacement. Specifically, the computing unit can determine that the plates and/or the discs are replaced when the current amount of displacement of the piston becomes smaller than the last historic data of the amount of displacement by more than the predetermined value. The detection value of the amount of displacement at this time is stored as the initial value while the actual replacement record is stored in the historic data, and an amount of abrasion from then on is computed based on the difference from the new initial value. Thereby it is avoided that an erroneous amount of abrasion is computed after replacing brakes, so that an amount of abrasion can be accurately measured.

BEST MODE FOR CARRYING OUT THE INVENTION

A preferable embodiment of the present invention will be described in detail below with reference to the attached drawings.

Figure 1:
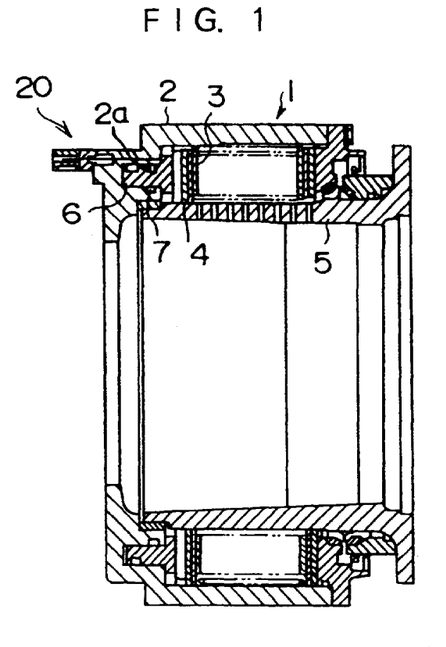
FIG. 1 is a sectional view of an abrasion detecting mechanism portion of a device for detecting abrasion according to the present invention.
Figure 2:
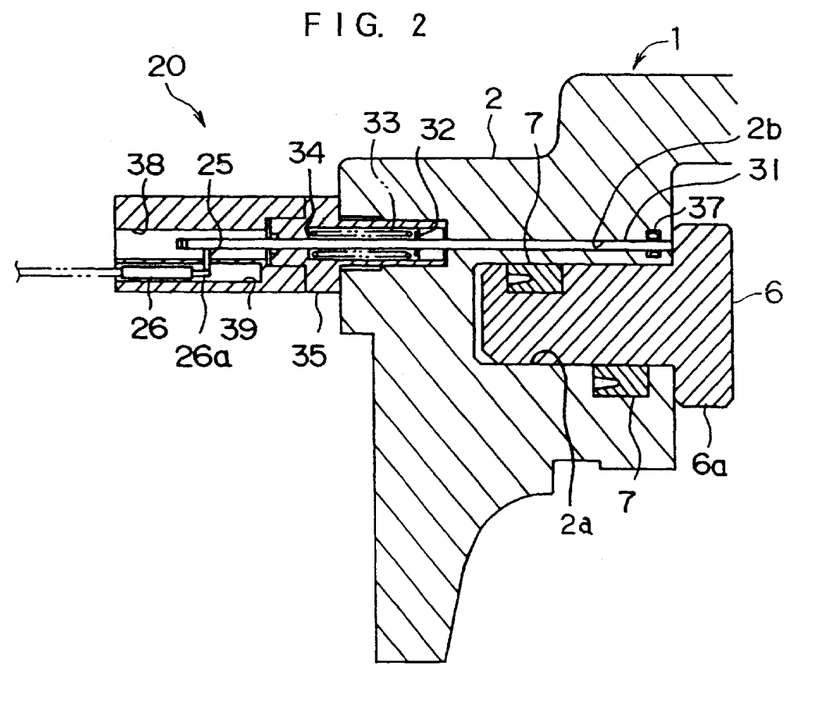
FIG. 2 is a sectional view of an essential part of the abrasion detecting mechanism portion in FIG. 1.

In FIGS. 1 and 2, an abrasion detecting mechanism portion 20 is attached at an end surface of an outer wall of an outer gear 2 behind a piston 6. The abrasion detecting mechanism portion 20 has a fixed member 35, which has one end screwed into the end of the outer gear 2. A hole 2b is provided in a hollow portion in the fixed member 35 inside the outer gear 2 and in the outer wall at the end of the outer gear 2, and a shaft 31 penetrates through the hole 2b. A spring 33 is provided between a ring 32, which is fixedly provided on the outer perimeter of the shaft 31, and an end face 34 of the aforesaid hollow portion. The front end portion of the shaft 31 is abutted at and pressed against a rear end surface of a pressurizing portion 6a of the piston 6, which brings plates 3 and discs 4 into pressure contact.

A hole 38, through which the shaft 31 penetrates, and a hole 39 in the vicinity of the hole 38 are provided in the rear portion of the hollow portion of the fixed member 35. A stroke sensor 26 is provided at a predetermined location in the hole 39. The stroke sensor 26 is composed of, for example, a potentiometer or the like, and a direct-acting potentiometer is shown in this embodiment. The main body of the direct-acting potentiometer is attached at the inner wall of the hole 39, and a sliding shaft 26a is coupled to the rear end portion of the shaft 31 by means of a coupling member 25. Incidentally, a stroke sensor 26 is attached at each brake of each wheel.

Figure 3:
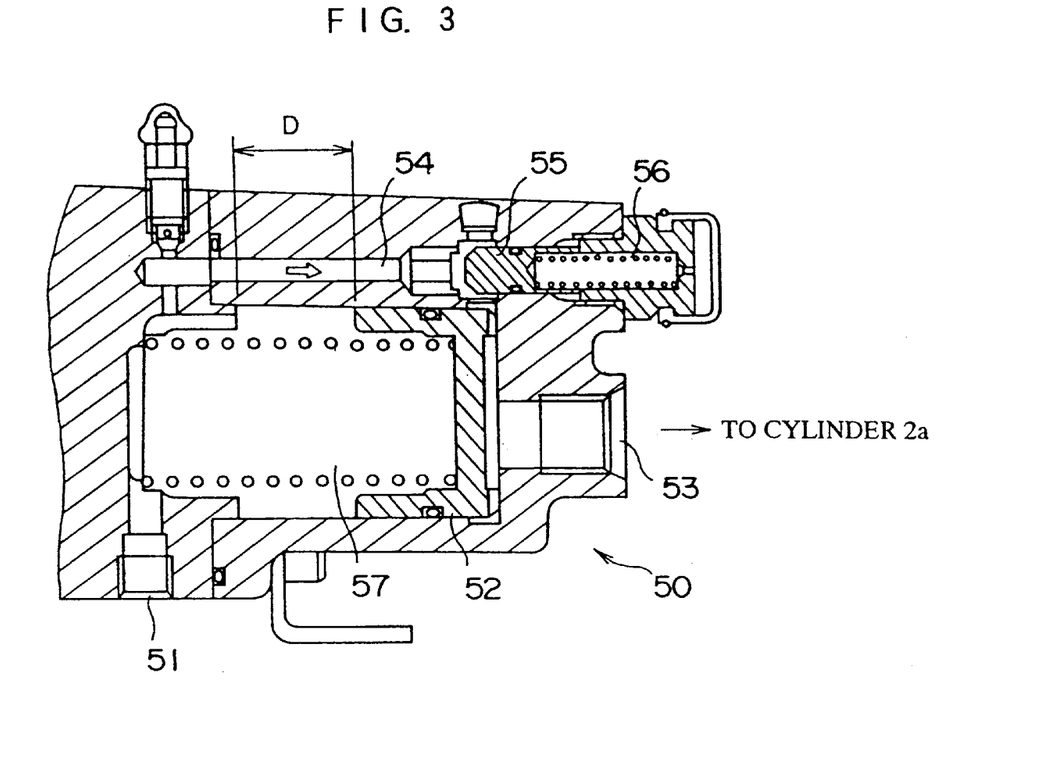
FIG. 3 is a sectional view of a piston displacement amount adjusting mechanism of the device for detecting abrasion according to the present invention.

FIG. 3 shows a displacement amount adjusting mechanism 50 for the piston 6. When a brake pedal (not illustrated) similar to the conventional art is pressed, brake oil, which is discharged from a brake chamber (not illustrated), enters an input port 51. Brake oil, which is supplied to an oil chamber 57, displaces an adjusting piston 52 as far as a distance D, and brake oil corresponding to the distance D flows out of an output port 53, The oil, which flow out of the output port 53, flows into the cylinder 2a, and displaces the piston 6 as far as a predetermined distance. At this time, the clearance between the pressurizing portion 6a and the adjacent disc 4 is only eliminated, and braking force is not produced.

When the oil pressure in the aforesaid brake chamber is greater than a previously specified pressure, a check valve 55 opens against the momentum of a spring 56. Thereby, brake oil flows out of the output port 53 through a pilot circuit 54, and works on the piston 6, thereby initiating a braking force. When the aforesaid brake pedal is released, back pressure is applied to the piston 6 by the oil pressure of brake cooling oil. At this time, the adjusting piston 52 is returned as far as the distance D, thereby the piston 6 is returned as far as a predetermined distance corresponding to the distance D. In this way, the amount of return of the piston 6 is normally adjusted at a predetermined value; therefore the amount of pressure on the brake pedal is constant when the brake is operated.

Figure 4:
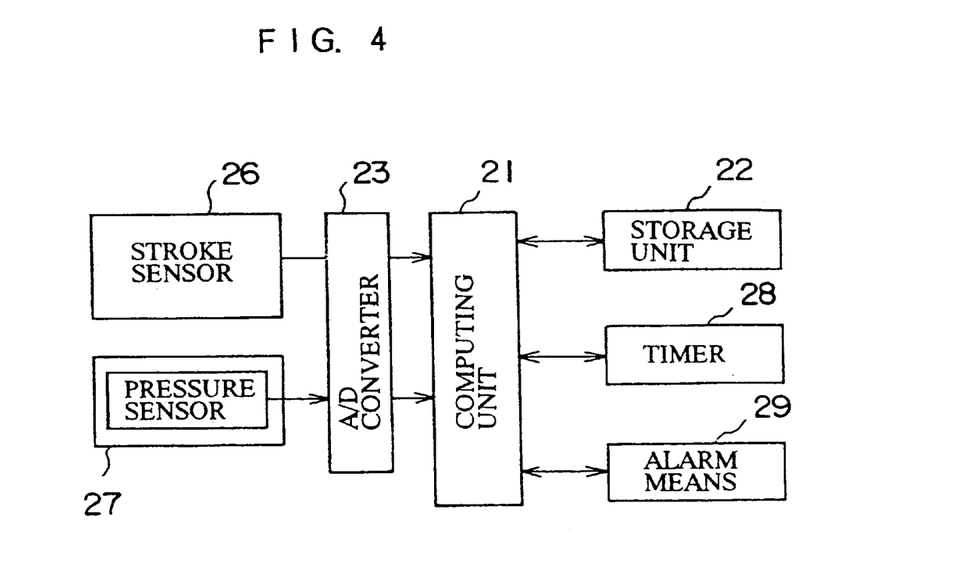
FIG. 4 is a block diagram of a configuration of the device for detecting abrasion according to the present invention.

In FIG. 4, a computing unit 21 is a computer system which is composed of, for example, a microcomputer or the like, and forms the core of the processing in an abrasion detecting device according to the present invention. An operation detecting means 27 detects the operation of the brake, and is composed of, for example, a pressure sensor for detecting the pressure of brake oil which is supplied into the cylinder 2a at the bottom of the piston 6. When the vehicle has, for example, four wheels, this pressure sensor can detect the pressure of each braking device in operation, which is provided at each wheel, or it can detect the pressure of only one brake of those at the four wheels. Detection signals from the stroke sensor 26 and the operation detecting means 27 are inputted into the computing device 21 through an A/D converter portion 23.

The computing unit 21, judging from a pressure value detected by the operation detecting means 27, actuates a timer 28. After a predetermined time has passed since the timer 28 started to operate, the computing unit 21 takes in a detected value from the stroke sensor 26 when a predetermined time passing signal (specifically, a measurement starting instruction) is inputted from the timer 28, and the computing unit 21 stores the detected value at a predetermined address in a storage unit 22. The storage unit 22 is composed of nonvolatile storage, and can be composed of, for example, C-MOS with backup, flash memory, a hard disc unit, or the like. An alarm means 29 inputs an alarm instruction from the computing unit 21 and gives an alarm to an operator, and is composed of at least one of, for example, a buzzer, a lamp indicator, a CRT display, and the like.

Figure 5:
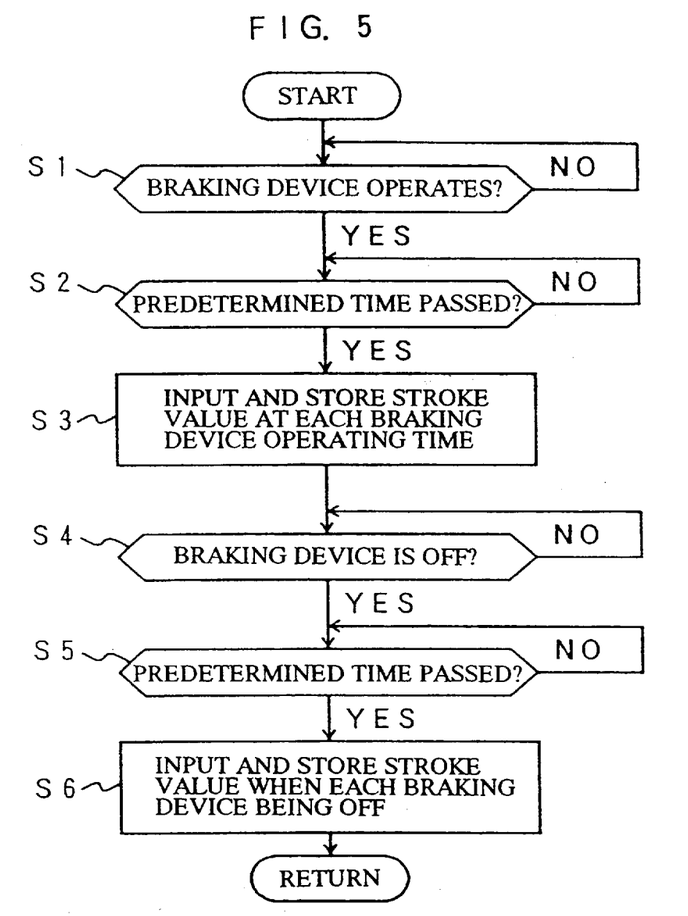
FIG. 5 is a flowchart for measuring a stroke relating to the present invention.

Next, the processing in the computing unit 21 will be explained in detail based on the flowcharts in FIGS. 5 and 7. FIG. 5 shows a method for obtaining stroke data (amount of displacement) of the piston 6 when the braking device is operated, and at first, the explanation will be made with reference to the same drawing. Here, S is given to a step number of each processing; for example, step 1 is represented as S1.

S1: Based on a detection signal from the operation detecting means 27, it is determined whether or not braking is initiated. Here, if the operation detecting means 27 is composed of a pressure sensor, it is determined whether braking is initiated by determining whether or not the detected pressure value is more than a predetermined value. For example, when the pressure sensor is provided at the braking device of each of four wheels, it is determined whether or not the pressure value of each pressure sensor is more than the predetermined value. If the braking is initiated (the pressure value is more than the predetermined value), proceed to S2, and if braking is not initiated, S1 is repeated until braking is initiated.

S2: It is determined whether or not a predetermined time has passed since the braking device was judged as operating. If the predetermined time has passed, proceed to S3, and if not, wait until after the predetermined time.

S3: A detected value Ln from the stroke sensor 26 when each braking device operating is inputted, and stored in the storage unit 22.

S4: It is determined whether or not the braking device is OFF, based on a detection signal from the operation detecting means 27. Here, if the operation detecting means 27 is composed of a pressure sensor, it is determined whether or not the braking device is OFF by determining whether or not the detected pressure value is less than a predetermined value. For example, when the pressure sensor is provided at the braking device of each of four wheels, it is determined whether or not the pressure value of each of the pressure sensors is less than the predetermined value (OFF). If it is OFF (the pressure value is less than the predetermined value), proceed to S5, and if not, S4 is repeated until it is OFF.

S5: It is determined whether or not a predetermined time has passed since the braking device was judged as being OFF. If the predetermined time has passed, proceed to S6, and if not, wait until after the predetermined time.

S6: The detected value from the stroke sensor 26 of each braking device is inputted, and stored in the storage unit 22. Thereafter, the processing is completed.

Figure 6:
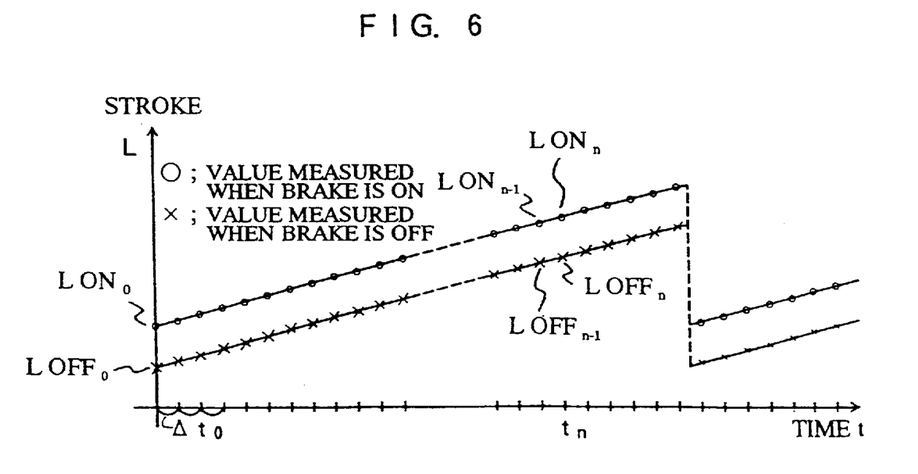
FIG. 6 shows a historic record of measurement data of the stroke of the device for detecting abrasion according to the present invention.

FIG. 6 shows the changes of a stroke L with respect to time, which is obtained by the above processing. A measurement result, which is obtained at each predetermined time $\Delta t0$, is plotted in the same drawing. The measurement of the stroke L according to the flowchart in FIG. 5 may be made by automatically operating and releasing the braking device, or may be made by an operator manually operating and releasing the braking device, for example, at every time a key switch of the vehicle is turned ON and the engine is started. Alternately, at every time the braking device is operated while actually traveling, the measurement according to the aforesaid flowchart can be automatically made. At this time, measurement data of each stroke sensor 26 as well as the measurement time are stored in the storage unit 22. The measurement data are accumulated in time sequence, and at each predetermined time $\Delta t0$, the sorting of data is carried out by leaving the last measurement data out of the accumulated data and erasing the other data. Thereby the measurement data at each predetermined time $\Delta t0$ is stored as a historic record. It should be mentioned that a method for storing the measurement data at each predetermined time $\Delta t0$ as a historic record is not limited to the above, and it is suitable, for example, if the first measurement data after the predetermined time $\Delta t0$ is stored. Here, as in FIG. 6, the strokes L when operating and releasing the braking device at a certain time tn are respectively set as L ON n, and L OFF n.

Figure 7:
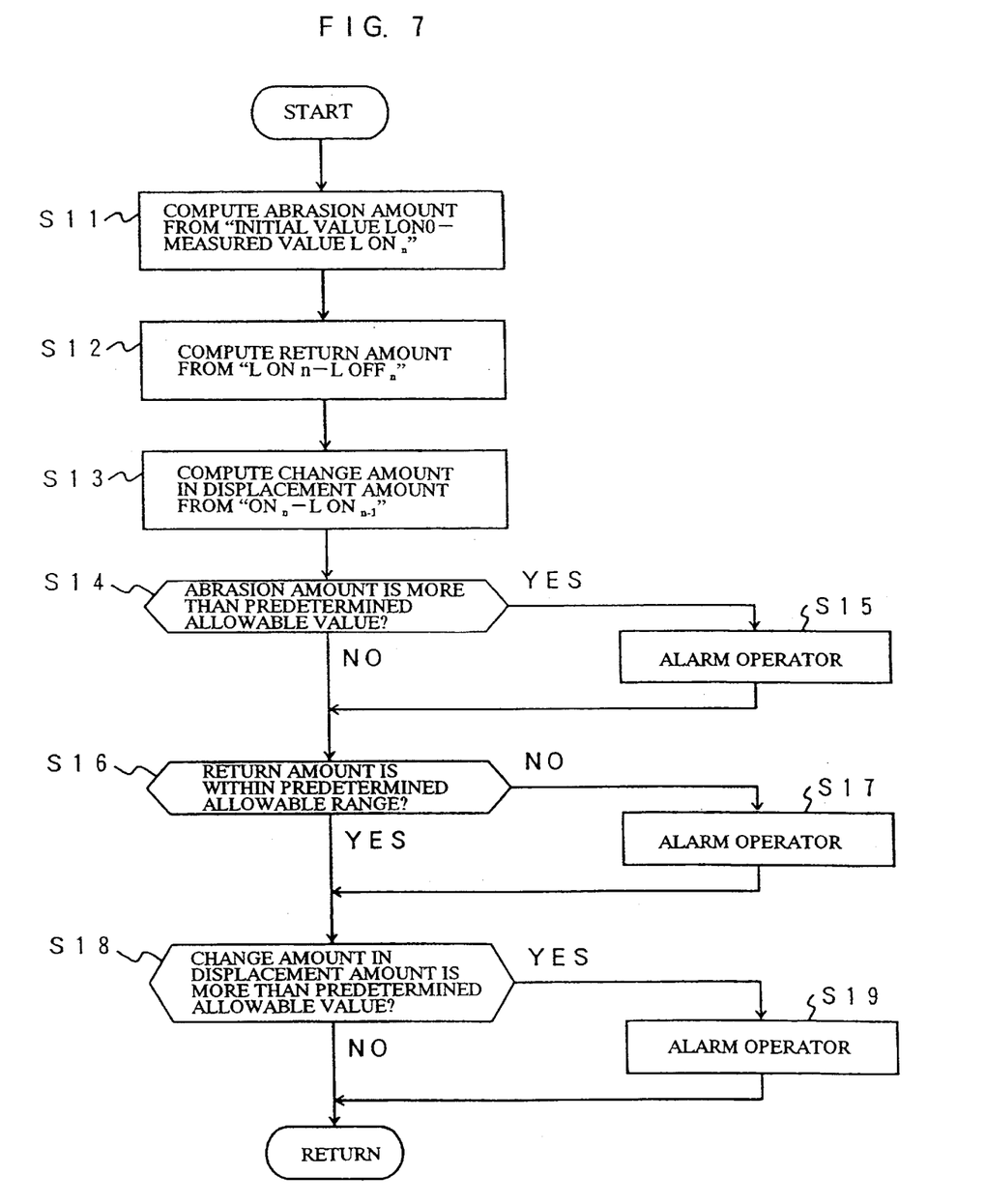
FIG. 7 is a flowchart for computing an amount of abrasion or the like according to the present invention.

FIG. 7 shows a method for computing the amount of abrasion and detecting abnormality from the aforesaid measurement results, and the processing flowchart will be explained.

S11: The amount of abrasion at the time tn is computed from an expression: the amount of abrasion=L ON 0–L ON n. Here, L ON 0 means the first measurement data after replacing the plates 3 and/or the discs 4.

S12: The amount of return of the piston 6 at the time tn is computed from an expression: the amount of return=L ON n–L OFF n.

S13: The amount of the change in the amount of displacement of the piston 6 at the time tn is computed from an expression: the amount of change=L ON n–L ON n–1.

S14: It is determined whether or not the amount of abrasion computed in the above is more than a predetermined allowable value. If it is more than the value, proceed to S15, and if not, proceed to S16.

S15: An alarm indicating that the amount of abrasion reaches the allowable value is given to an operator by the alarm means 29. Next, proceed to S16.

S16: It is determined whether or not the amount of return computed in the above is within a predetermined allowable range ($\alpha 1$ to $\alpha 2$). If it is within the allowable range, proceed to S18, and if it is out of the allowable range, proceed to S17. Here, $\alpha 1$ and $\alpha 2$ are the minimum allowable value and the maximum allowable value of the amount of return.

S17: An alarm indicating that the amount of return is abnormal is given to the operator by the alarm means 29. When the amount of return is less than the minimum allowable value $\alpha 1$, it suggests that a trouble, such as a scoring phenomenon, may have occurred to the displacement amount adjusting mechanism 50 of the braking device. On the other hand, when the amount of return is more than the maximum allowable value $\alpha 2$, it suggests that a trouble may have occurred to the stroke sensor 26. Next, proceed to S18.

S18: It is determined whether or not the amount of the change in the amount of displacement, which is computed in the above, is more than a predetermined allowable value, and if it is more than the allowable value, proceed to S19. If it is not, the present processing is completed, and the processing is repeated from S11 at predetermined times $\Delta t0$.

S19: The operator is given an alarm by the alarm means 29 indicating that the amount of the change in the amount of displacement is more than the allowable value and that some trouble, which abnormally increases the amount of abrasion, is occurring. Next, the present processing is completed, and the processing is repeated from S11 at predetermined times $\Delta t0$.

In this way, the stroke L of the piston 6 operating is recorded in time sequence as historic data, and based on the difference between the current stroke L and the initial value at each time, the amount of the abrasion of the braking device is detected. Accordingly, the amount of abrasion is accurately measured, therefore it can be detected that the amount of abrasion reaches the allowable value with excellent precision. Further, the detected value of the stroke sensor 26 is inputted after a predetermined time has passed since the operation detecting means 27 detects the operation; therefore the amount of the displacement of the piston 6 can be measured when the piston 6 is surely at the position (forward end) to bring the plates 3 and the discs 4 into pressure contact. Thereby the accurate amount of displacement can be measured.

By detecting an abnormal amount of return of the braking device at each time, a scoring phenomenon in the displacement amount adjusting mechanism 50 of the braking device, a trouble in the stroke sensor 26, or the like can be detected. Accordingly, the reliability of the abrasion detecting device is increased. Further, by detecting an abnormal increase in the amount of the change in the amount of displacement, abnormal conditions of abrasion in the plates 3 and the discs 4 are detected. Thereby, the early detection of a trouble in the braking device and the preventive maintenance thereof are enabled. Incidentally, the amount of the change in the amount of displacement is computed from the expression: the amount of change=L ON n–L ON n–1, but if detection of abnormality is difficult because the amount of the change is too small due to the predetermined time $\Delta t0$ being too short, it can be detected based on the total amount of some of the aforesaid amounts of change at each predetermined time $\Delta t0$.

Immediately after the plates 3 and the discs 4 are replaced by new ones, the amount of the displacement of the piston 6 is suddenly decreased, and the stroke L is decreased, as is shown in FIG. 6. Accordingly, when the amount of the decrease in the stroke L is more than a predetermined value, the plates 3 and the discs 4 are regarded as being replaced by new ones, and the actual fact of replacement is recorded in the historic data, while the measurement values at this time are stored as the initial value of the stroke L, which are L ON 0 and L OFF 0. Thereby the amount of abrasion can also be detected with excellent precision in the new plates and discs. Incidentally, the default value (set value) for the stroke L at the time of manufacturing this abrasion detecting device, can be set to be greater than the stroke L at the limit of the amount of abrasion; thereby the first measurement values can be stored as the initial values L of the stroke L after being manufactured, which are L ON 0 and L OFF 0.

The operation detecting means 27 can be composed of a pressure switch or the like which turns ON or OFF the output contact point signal when the pressure value greater than a predetermined value is detected, or it can be composed of a pressing amount sensor for detecting the amount of pressure on the brake pedal. When using the pressing amount sensor and the pressing amount is greater than the predetermined value, it can be determined that the brake is operated; and if it is less than the predetermined value, it can be determined that the brake is released; therefore the same operation and effects as in the above explanation can be obtained.

Figure 8:
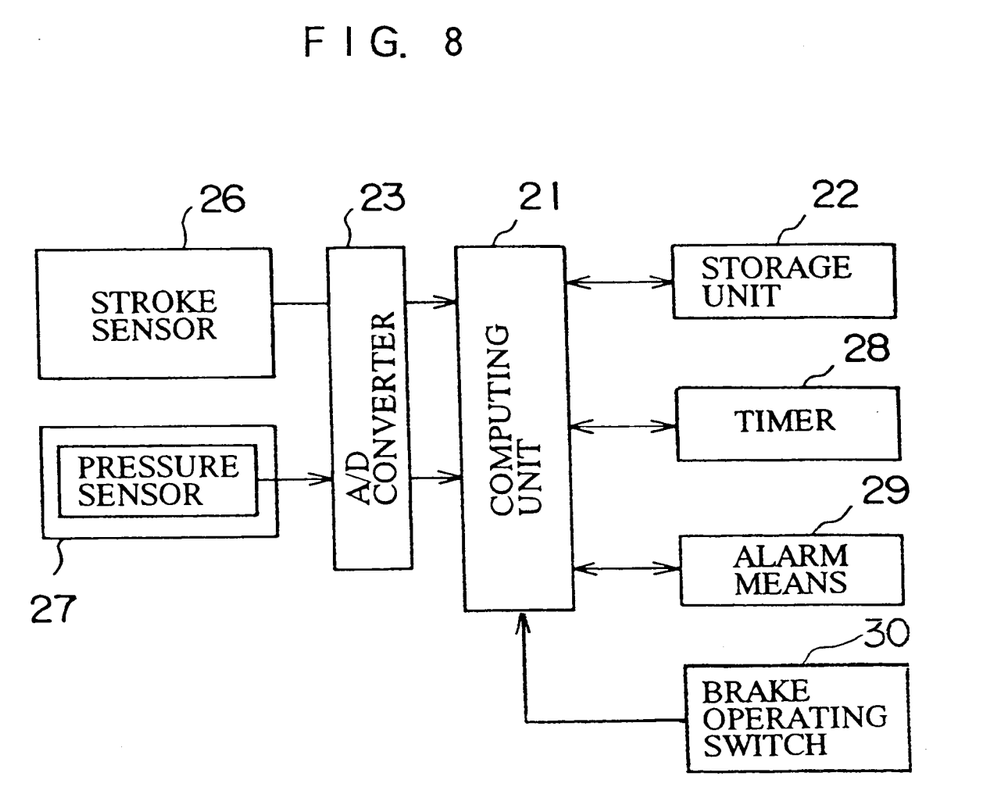
FIG. 8 is a block diagram of a configuration of another embodiment of the device for detecting abrasion according to the present invention.

A measurement starting instruction for inputting a detected value of the stroke sensor 26 is obtained by an output signal of the timer 28, but it is not restrictive. For example, as shown in FIG. 8, a brake operating switch 30 can be further added to the computing unit 21 in the aforesaid embodiment in FIG. 4. Thereby, when it is determined that the piston 6 completely brings the plates 3 and the discs 4 into pressure contact after the braking device is operated, an operator can output the measurement starting instruction to the computing unit 21 by manipulating the brake operating switch 30. Incidentally, the measurement may be started by the instruction from the timer 28 or by the brake operating switch 30, or by the instructions from the timer 28 and the brake operating switch 30.

INDUSTRIAL AVAILABILITY

The present invention is useful as a device for detecting abrasion of a brake for a vehicle, by which a time of abrasion can be accurately and surely detected, and the operability is improved at the time of replacing the brake.

We claim:

1. A device for detecting abrasion of a vehicle brake, said device comprising:
   an outer gear;
   an inner gear;
   a plurality of plates engaged in said outer gear;
   a plurality of discs engaged in said inner gear, said plurality of discs being alternately spaced with respect to said plurality of plates;
   a piston for bringing said plates and said discs into pressure contact with each other to thereby brake a vehicle;
   an operation detecting means for detecting that braking has been initiated and for providing a braking initiation signal representative thereof;
   a stroke sensor for detecting a stroke of said piston at a pressure contact position where said plates and said discs are brought into pressure contact with each other; and
   a computing unit for, after inputting said braking initiation signal from said operation detecting means, inputting from said stroke sensor a currently detected stroke of the piston at the pressure contact position, and for computing amounts of abrasion of said plates and said discs from a difference between a currently detected stroke of the piston and an initial value, said initial value being a first detected value of the stroke of said piston.

2. A device for detecting abrasion of a vehicle brake in accordance with claim 1, wherein said computing unit includes at least one of:
   a timer for outputting, after a predetermined time has passed since the braking initiation signal was inputted, a measurement starting instruction for determining the currently detected stroke of the piston at the pressure contact position; and
   a brake operating switch which is operated at a time of braking initiation and which outputs a measurement starting instruction for determining the currently detected stroke of the piston at the pressure contact position;
   wherein said computing unit, upon outputting of a measurement starting instruction by said timer or said brake operating switch, inputs from said stroke sensor the currently detected stroke of the piston at the pressure contact position.

3. A device for detecting abrasion of a vehicle brake in accordance with claim 2, wherein said operation detecting means includes any one of
   a pressure sensor for detecting pressure of brake oil which is applied to said piston at time of braking initiation, and
   a pressing amount sensor for detecting an amount of pressure on a brake pedal; and
   wherein said operation detecting means detects braking initiation based on a detection signal from the thus included sensor.

4. A device for detecting abrasion of a vehicle brake in accordance with claim 3, wherein said computing unit includes a storage unit;
   wherein said computing unit stores in said storage unit a stroke of said piston at the pressure contact position at a plurality of times;
   wherein said computing unit determines that at least one of said plates and said discs has been replaced when a currently detected stroke of said piston is smaller than a previous stroke of said piston by more than a predetermined value, stores said currently detected stroke in said storage unit as the initial value, and stores the previous stroke as a historic record in said storage unit.

5. A device for detecting abrasion of a vehicle brake in accordance with claim 4, wherein said stroke sensor comprises a potentiometer having a sliding shaft which is moved responsive to movement of said piston.

6. A device for detecting abrasion of a vehicle brake in accordance with claim 1, wherein said operation detecting means includes any one of
   a pressure sensor for detecting pressure of brake oil which is applied to said piston at time of braking initiation, and
   a pressing amount sensor for detecting an amount of pressure on a brake pedal; and
   wherein said operation detecting means detects braking initiation based on a detection signal from the thus included sensor.

7. A device for detecting abrasion of a vehicle brake in accordance with claim 1, wherein said computing unit includes a storage unit;
   wherein said computing unit stores in said storage unit a stroke of said piston at the pressure contact position at a plurality of times;
   wherein said computing unit determines that at least one of said plates and said discs has been replaced when a currently detected stroke of said piston is smaller than a previous stroke of said piston by more than a predetermined value, stores said currently detected stroke in said storage unit as the initial value, and stores the previous stroke as a historic record in said storage unit.

8. A device for detecting abrasion of a vehicle brake in accordance with claim 1, wherein said stroke sensor comprises a potentiometer having a sliding shaft which is moved responsive to movement of said piston.

9. A device for detecting abrasion of a vehicle brake, said device comprising:
   an outer gear;
   an inner gear;
   a plate engaged in said outer gear;
   a disc engaged in said inner gear;
   a piston for bringing said plate and said disc into pressure contact with each other to thereby brake a vehicle;

an operation detecting means for detecting that braking has been initiated and for providing a braking initiation signal representative thereof;

a stroke sensor for detecting a stroke of said piston at a pressure contact position where said plate and said disc are brought into pressure contact with each other; and a computing unit for, after inputting said braking initiation signal from said operation detecting means, inputting from said stroke sensor a currently detected stroke of the piston at the pressure contact position, and for computing amounts of abrasion of said plate and said disc from a difference between a currently detected stroke of the piston and an initial value, said initial value being a first detected value of the stroke of said piston.

10. A device for detecting abrasion of a vehicle brake in accordance with claim 9, wherein said computing unit includes at least one of:

a timer for outputting, after a predetermined time has passed since the braking initiation signal was inputted, a measurement starting instruction for determining the currently detected stroke of the piston at the pressure contact position; and a brake operating switch which is operated at a time of braking initiation and which outputs a measurement starting instruction for determining the currently detected stroke of the piston at the pressure contact position;

wherein said computing unit, upon outputting of a measurement starting instruction by said timer or said brake operating switch, inputs from said stroke sensor the currently detected stroke of the piston at the pressure contact position.

11. A device for detecting abrasion of a vehicle brake in accordance with claim 9, wherein said operation detecting means includes any one of a pressure sensor for detecting pressure of brake oil which is applied to said piston at time of braking initiation, and a pressing amount sensor for detecting an amount of pressure on a brake pedal; and wherein said operation detecting means detects braking initiation based on a detection signal from the thus included sensor.

12. A device for detecting abrasion of a vehicle brake in accordance with claim 9, said computing unit includes a storage unit;

wherein said computing unit stores in said storage unit a stroke of said piston at the pressure contact position at a plurality of times;

wherein said computing unit determines that at least one of said plate and said disc has been replaced when a currently detected stroke of said piston is smaller than a previous stroke of said piston by more than a predetermined value, stores said currently detected stroke in said storage unit as the initial value, and stores the previous stroke as a historic record in said storage unit.

* * * * *